United States Patent
Chuo et al.

(10) Patent No.: US 12,320,913 B2
(45) Date of Patent: Jun. 3, 2025

(54) INDOOR LOCALIZATION USING BLUETOOTH HIGH-ACCURACY DISTANCE MEASUREMENT

(71) Applicant: Google LLC, Mountain View, CA (US)

(72) Inventors: Li-Xuan Chuo, San Jose, CA (US); Qi Jiang, San Jose, CA (US); Daniel Jose Fernandes Barros, Mountain View, CA (US)

(73) Assignee: Google LLC, Mountain View, CA (US)

( * ) Notice: Subject to any disclaimer, the term of this patent is extended or adjusted under 35 U.S.C. 154(b) by 327 days.

(21) Appl. No.: 17/820,101

(22) Filed: Aug. 16, 2022

(65) Prior Publication Data

US 2022/0390547 A1    Dec. 8, 2022

Related U.S. Application Data

(60) Provisional application No. 63/371,481, filed on Aug. 15, 2022.

(51) Int. Cl.
   *G01S 5/06*    (2006.01)
   *H04W 64/00*   (2009.01)

(52) U.S. Cl.
   CPC .............. *G01S 5/06* (2013.01); *H04W 64/003* (2013.01); *G01S 2205/02* (2020.05)

(58) Field of Classification Search
   CPC ...... G01S 5/06; G01S 2205/02; G01S 5/0027; G01S 13/765; G01S 5/10; H04W 64/003
   See application file for complete search history.

(56) References Cited

U.S. PATENT DOCUMENTS

| | | | |
|---|---|---|---|
| 2017/0234962 A1* | 8/2017 | Yang | G01S 5/02524 342/465 |
| 2017/0269189 A1 | 9/2017 | Swindell et al. | |
| 2017/0363423 A1* | 12/2017 | Dormody | G01C 17/38 |
| 2021/0112548 A1* | 4/2021 | de Perthuis | G01S 13/765 |

(Continued)

FOREIGN PATENT DOCUMENTS

CN        114189924 A  *  3/2022

OTHER PUBLICATIONS

Paterna, et al., "A Bluetooth Low Energy Indoor Positioning System with Channel Diversity, Weighted Trilateration and Kalman Filtering", Dec. 16, 2017, 32 pages.

(Continued)

*Primary Examiner* — Umair Ahsan
(74) *Attorney, Agent, or Firm* — Colby Nipper PLLC

(57) ABSTRACT

This document describes techniques and systems for indoor localization using Bluetooth high-accuracy distance measurement (HADM). In examples, the described systems and techniques perform a signal-strength scan to identify multiple anchor points and then pair, based on the signal-strength scan, the tagged device with a first anchor point of the identified anchor points. A HADM time slot is set for the first anchor point and at least two additional anchor points of the identified anchor points. A HADM event is initiated, the HADM event including sending a HADM ping and receiving HADM responses from two or more of the identified anchor points. Based on at least a time of receipt of HADM responses received from the two or more of the identified anchor points, the location of the tagged device is calculated.

6 Claims, 5 Drawing Sheets

(56) References Cited

U.S. PATENT DOCUMENTS

2022/0086068 A1* 3/2022 Stanciu .................. G01S 11/02
2022/0200656 A1* 6/2022 Subraveti .............. G01S 13/765
2022/0314934 A1* 10/2022 Smith .................... H01Q 21/30
2022/0322029 A1* 10/2022 Smith .................... H04W 4/023

OTHER PUBLICATIONS

Subedi, et al., "A Survey of Smartphone-Based Indoor Positioning System Using RF-Based Wireless Technologies", Dec. 17, 2020, 32 pages.

* cited by examiner

INDOOR LOCALIZATION USING BLUETOOTH HIGH-ACCURACY DISTANCE MEASUREMENT

INCORPORATION BY REFERENCE

This application claims priority to U.S. Provisional Patent Application No. 63/371,481, filed Aug. 15, 2022, the disclosure of which is incorporated by reference in its entirety.

SUMMARY

This document describes techniques and systems for indoor localization using Bluetooth high-accuracy distance measurement (HADM). The described techniques and systems (collectively "techniques") determine locations for tagged devices (e.g., cellphones, tablets, and/or other mobile devices) having a data tag identifying them to a wireless mesh network). These techniques identify a location using as few as one HADM ping to initiate multiple HADM responses from anchor points of known locations. In some aspects, an anchor point (e.g., a Wi-Fi access point) is paired with a tagged device. The tagged device supplies a list of other anchor points (within communication range of the tagged device) to the paired anchor point. The paired anchor point coordinates a HADM time slot with the listed anchor points. The tagged device sends (transmits) a HADM ping and the coordinated anchor points send (transmit) HADM responses. The tagged device receives the HADM responses and uses the delay between the ping and each response, along with the known locations of the anchor points, to calculate a location of the tagged device.

By sending fewer pings, implementations of the disclosed techniques use less energy (have a lower power consumption) than existing ping-and-response HADM techniques utilized to identify device locations. The energy savings occurs each time the location of the tagged device is identified. As the location of a tagged device in some aspects is performed repeatedly, the total energy savings are multiplied. The energy savings are particularly useful because mobile devices (when not connected to an external power supply) are powered by batteries and the energy savings leads to a longer battery life. The techniques may use the tagged device to produce the initial ping, however, in some other cases, the ping is produced by an anchor point, further increasing the energy savings. Accordingly, these techniques provide enhanced indoor localization over existing techniques.

This Summary is provided to introduce simplified concepts of indoor localization using Bluetooth HADM, which is further described below in the Detailed Description. This Summary is not intended to identify essential features of the claimed subject matter, nor is it intended for use in determining the scope of the claimed subject matter.

BRIEF DESCRIPTION OF THE DRAWINGS

The details of one or more aspects of indoor localization using Bluetooth high-accuracy distance measurement (HADM) are described in this document with reference to the following drawings.

The same numbers are used throughout the drawings to reference like features and components.

DETAILED DESCRIPTION

Figure 1:
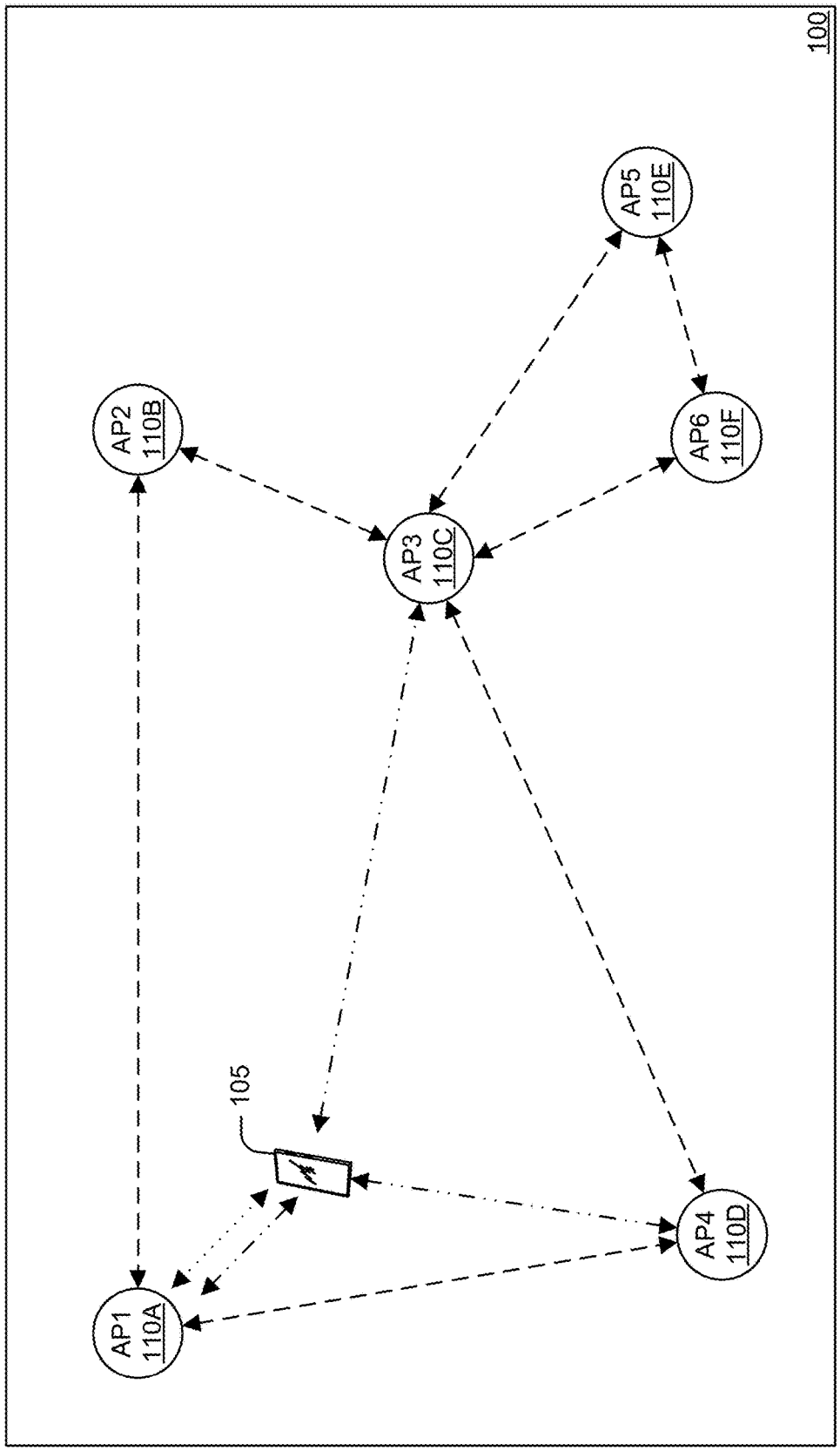
FIG. 1 illustrates an example implementation of a single-tagged device HADM localization system.

FIG. 1 illustrates an example implementation of a single-tagged device HADM localization system in which aspects of techniques and systems for indoor localization using Bluetooth high-accuracy distance measurement (HADM) may be implemented. The implementation includes a room 100 with a tagged device 105 and multiple anchor points (110A, 110B, 110C, 110D, 110E, 110F). The tagged device 105, in some aspects, is a cellphone, a tablet, another mobile device, or a stationary device. The tagged device 105 is able to transmit a HADM ping and receive HADM responses. The anchor points 110A-110F (respectively illustrated as AP1 through AP6 in the figure) may be one or more of wireless anchor points (e.g., Wi-Fi anchor point) or smart home devices.

In some aspects, the anchor points are connected in a wireless mesh network (e.g., a peer-to-peer communications network of interconnected Wi-Fi devices organized in a mesh topology, generally within a localized area such as a home or an office). In FIG. 1, a wireless mesh connections connect one or more of anchor point 110A and anchor point 110B, anchor point 110A and anchor point 110D, anchor point 110B and anchor point 110C, anchor point 110C and anchor point 110D, anchor point 110C and anchor point 110E, anchor point 110C and anchor point 110F, or anchor point 110E and anchor point 110F.

In the aspect of FIG. 1, the tagged device 105 pairs with anchor point 110A, for example, through a Bluetooth Low Energy (BLE) connection. In some aspects, the paired anchor point 110A is a Wi-Fi anchor point. In other aspects, the paired anchor point 110A is a smart home device. The tagged device 105 performs a HADM event with anchor point 110A, a HADM event with anchor point 110C, and a HADM event with anchor point 110D. A HADM event may include a HADM ping transmitted by the tagged device 105 and one or more pongs (responses) to that ping received by the tagged device 105 from the anchor point.

Figure 2:
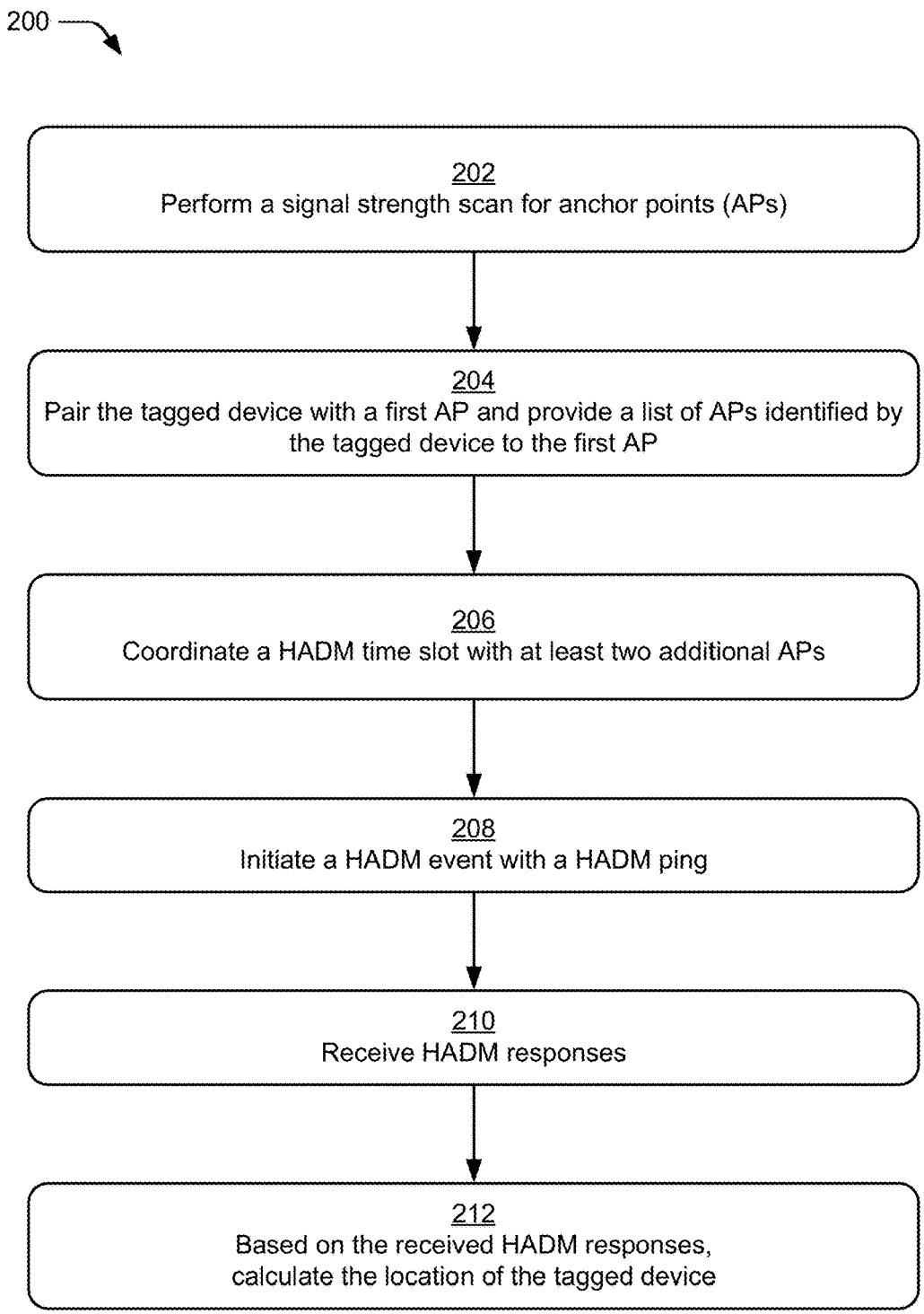
FIG. 2 illustrates an example flowchart of a coordinated HADM localization system.
Figure 3:
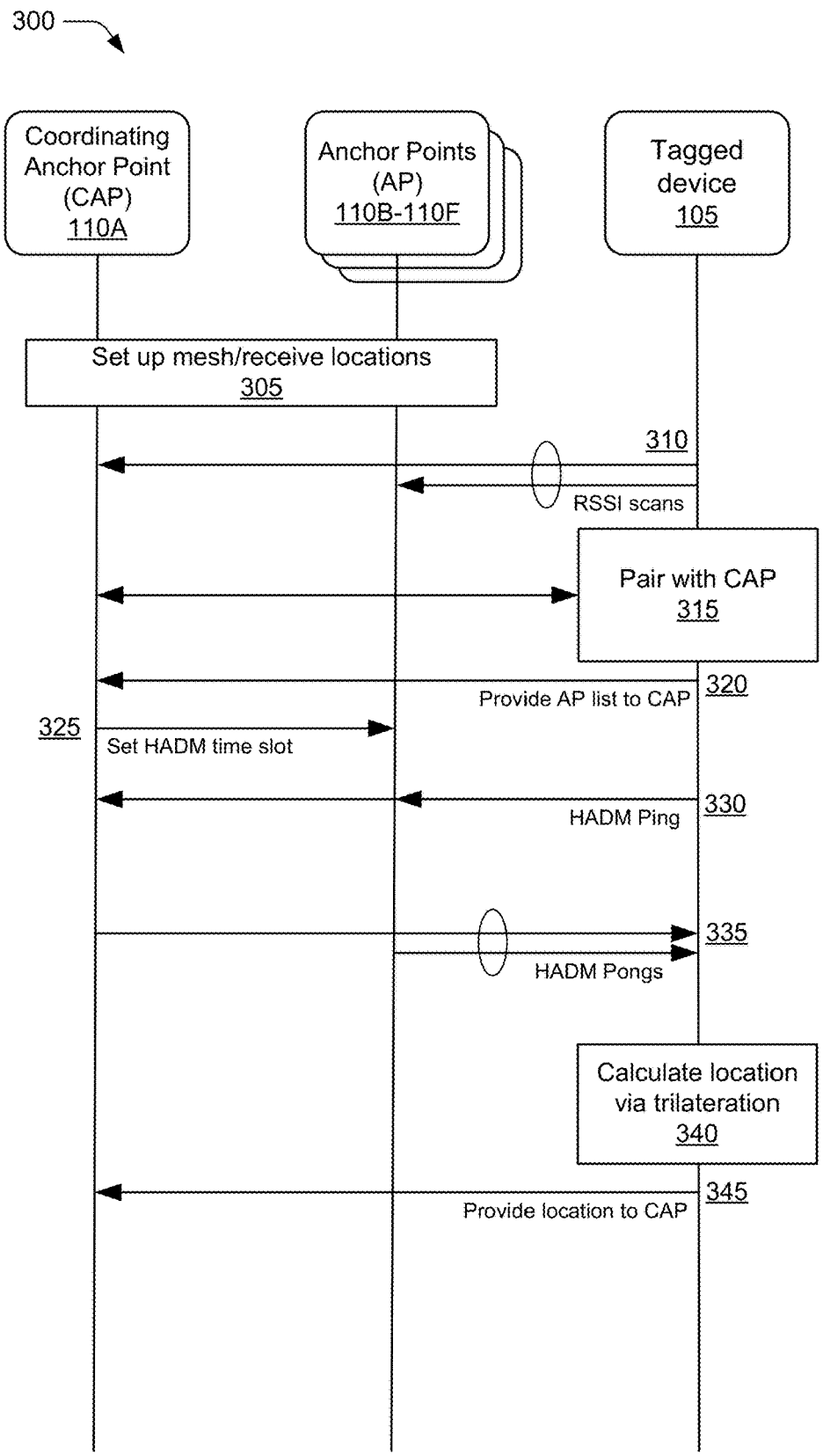
FIG. 3 illustrates example data and control transactions for a single-tagged device coordinated HADM localization system.

An example method for indoor localization using Bluetooth high-accuracy distance measurement to determine locations for tagged devices is described with respect to the flowchart in FIG. 2, while a more detailed description of the data and control transactions taking place in FIG. 1 are described with respect to FIG. 3.

FIG. 2 illustrates an example flowchart 200 of a coordinated HADM localization system. The flowchart 200 illustrates a general method that may be implemented for indoor localization using Bluetooth high-accuracy distance measurement to determine locations for one or more tagged devices. At 202, a signal strength scan (e.g., a Received Signal Strength Indicator (RSSI) scan) is performed by the tagged device (e.g., tagged device 105 of FIG. 1). This signal strength scan may identify anchor points with which the tagged device can communicate.

The tagged device pairs, at 204, to with a first anchor point of the identified anchor points (e.g., anchor point 110A in FIG. 1), for example, through a BLE connection. In some aspects, this pairing is with a wireless anchor point (AP), in other aspects, either a Wi-Fi anchor point or a smart home device may pair with the tagged device. At 204, the tagged device also provides, to the first anchor point (the "paired anchor point"), a list of additional anchor points identified by the tagged device in the signal strength scan that the tagged device is capable of receiving signals from (e.g., anchor points 110A-110F in FIG. 1). In some aspects, the list includes all anchor points scanned by the tagged device. In other aspects, the list includes a subset of the scanned anchor points (e.g., the anchor points with which the tagged device receives the stronger signals).

At 206, the paired anchor point coordinates a HADM time slot with at least two additional anchor points (e.g., from the list provided by the tagged device). The coordination prepares the additional anchor points to respond to a HADM ping. At 208, a HADM event is initiated with a HADM ping, for example, by a HADM ping transmitted by the tagged device. In aspects, the HADM ping may be provided by the paired anchor point.

At 210, the tagged device receives at least one HADM response from one or more anchor points. In aspects in which the paired anchor point performed the HADM ping, the tagged device receives the HADM ping as well. In some aspects, the HADM responses include location data from the transmitting anchor point that may also be used in the location calculation. Calculating the location of the tagged device may include calculating a triangular trajectory.

In other aspects, the tagged device receives anchor point location data in some other way (e.g., when pairing with the coordinating anchor point, as part of some other communication with one or more anchor points). At 212, the tagged device calculates its own location based on the received HADM responses. In aspects, the tagged device calculates its location based at least on the received time of receipt HADM responses.

FIG. 3 illustrates example data and control transactions 300 for a single-tagged device coordinated HADM localization system in which aspects of techniques and systems for indoor localization using Bluetooth HADM may be implemented. The example data and control transactions 300 are performed by and between a tagged device 105, a coordinating anchor point 110A, and a set of additional anchor points 110B-110F. In aspects, these devices are arranged as shown in FIG. 1, however, the devices are not limited to any specific arrangement.

At 305, the coordinating anchor point (CAP) 110A and anchor points 110B-110F are set up in a wireless mesh network (e.g., as shown in FIG. 1). At 310, the tagged device 105 performs a signal scan(s) (e.g., an RSSI scan) to identify which anchor points (110A-110F) it can receive signals from. At 315, the tagged device 105 pairs with the coordinating anchor point 110A, for example, through a BLE connection. In some aspects, the coordinating anchor point 110A is selected for pairing based on having the highest measured signal strength by the tagged device 105. The tagged device 105 may only pair with a Wi-Fi anchor point (e.g., a Wi-Fi root anchor point), in other aspects, the tagged device may also pair with a smart home device.

At 320, the tagged device 105 provides a list of anchor points from which the tagged device 105 received signals from (e.g., during the signal scan at 310). In some aspects, this list may include all anchor points from which the tagged device detects signals, in other aspects, the list may include a subset of the detected anchor points (e.g., the anchor points with the stronger signals at the tagged device 105).

At 325, the coordinating anchor point 110A sets a HADM time slot with at least two other anchor points (e.g., two or more of anchor points 110B-110F). In order to set the HADM time slot with the other anchor points, the coordinating anchor point selects a set of additional (e.g., additional to the paired/coordinating anchor point) anchor points from the provided list of anchor points. The coordinating anchor point then sends a set of one or more designation signals to the additional anchor points. The signals designate the additional anchor points as being selected for the HADM time slot and direct the additional anchor points to prepare to respond to the HADM ping from the tagged device (e.g., a ping received within the HADM time slot).

At 330, the tagged device 105 sends a HADM ping to the coordinating anchor point 110A and the other anchor points (e.g., two or more of 110B-110F) with the coordinated HADM time slot. The HADM ping is received by the coordinating anchor point 110A and the other anchor points. At 335, one or more of the anchor points with the HADM time slot (including coordinating anchor point 110A) send a HADM pong (e.g., a HADM reply to the HADM ping) to the tagged device 105. In some aspects, the HADM ping is a single ping sent from the tagged device that causes the coordinating anchor point and the additional anchor points to send HADM responses. This is different from existing HADM ping response systems in which each HADM ping results in a response from only a single anchor point.

At 340, the tagged device 105 calculates its own location via trilateration (e.g., based on the delay between the ping and the received pongs from the coordinated anchor points). As the initial HADM ping is sent from the tagged device 105 itself, the delay between the HADM ping and a particular HADM pong enables the tagged device 105 to calculate a distance between the tagged device and the anchor point that send that HADM pong.

Data identifying the locations of at least three anchor points and the distance of the tagged device 105 from each of those anchor points may allow the location of the anchor point to be calculated by trilateration. Trilateration effectively localizes the tagged device 105 on three circles, each of a known radius (the calculated distance from an anchor point) around the anchor points in the HADM event and identifies the location of the tagged device 105 as the intersection of those three circles. In some aspects, the calculations for the location of a tagged device is performed in two dimensions, with only the horizontal coordinates of the anchor points in the wireless mesh network considered. In other aspects, the calculation for the location of a tagged device is performed in three dimensions (e.g., localizing the tagged device at the intersection of multiple spheres) with the vertical coordinates of the tagged device considered as well. In some aspects, HADM pongs and locations from more than three anchor points are used (e.g., for confirmation/error checking, additional accuracy). In some aspects, these calculations may include adjustments for the response time of the devices. In some aspects, once the tagged device 105 calculates its own location, it provides, at 345, that location to the coordinating anchor point 110A.

In the aspects described with respect to FIGS. 1 and 3, the HADM ping is sent from the tagged device 105. In other aspects, the HADM ping may be sent by the coordinating anchor point 110A. Although aspects in which a HADM ping is sent by the coordinating anchor point 110A can be used to allow a single-tagged device to identify its location, in some aspects, multiple-tagged devices may concurrently use a single HADM ping from a single anchor point and multiple triggered HADM pongs (from anchor points coordinated by the single anchor point).

Figure 4:
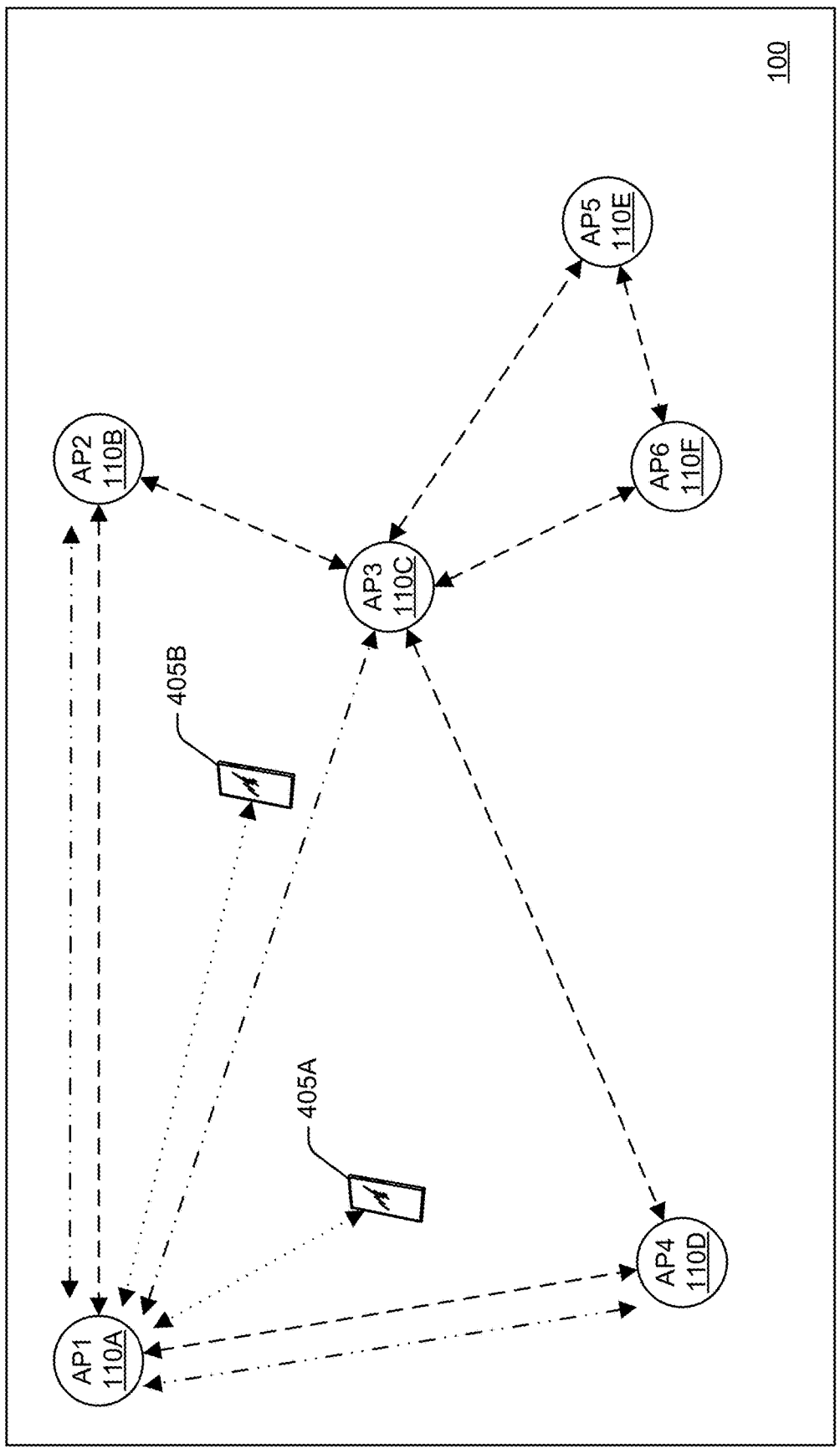
FIG. 4 illustrates an example implementation of a multi-tagged device HADM localization system.

FIG. 4 illustrates an example implementation of a multi-tagged device HADM localization system. In the illustrated aspect, the anchor points 110A-110F are similar to those shown in FIG. 1 but implement a different method. In this aspect, tagged devices 405A and 405B both pair with anchor point 110A, for example, through BLE connections. The illustrated aspect includes a HADM event between anchor point 110A and anchor points 110B, 110C, and 110D. Because tagged devices 405A and 405B are not sending signals of the HADM event, the event is not shown as connecting to the devices 405A and 405B. However, as described with respect to FIG. 5, the tagged devices 405A and 405B may receive both the HADM ping sent from the paired anchor point 110A and the HADM pongs sent from the anchor points 110B, 110C, and 110D. Additionally, the HADM event itself may be requested by the tagged devices 405A and 405B, even though the HADM ping that initiates the HADM event is sent from the anchor point 110A. Although the illustrated example includes only two tagged devices 405A and 405B, in some aspects, any number of tagged devices can be used.

Figure 5:
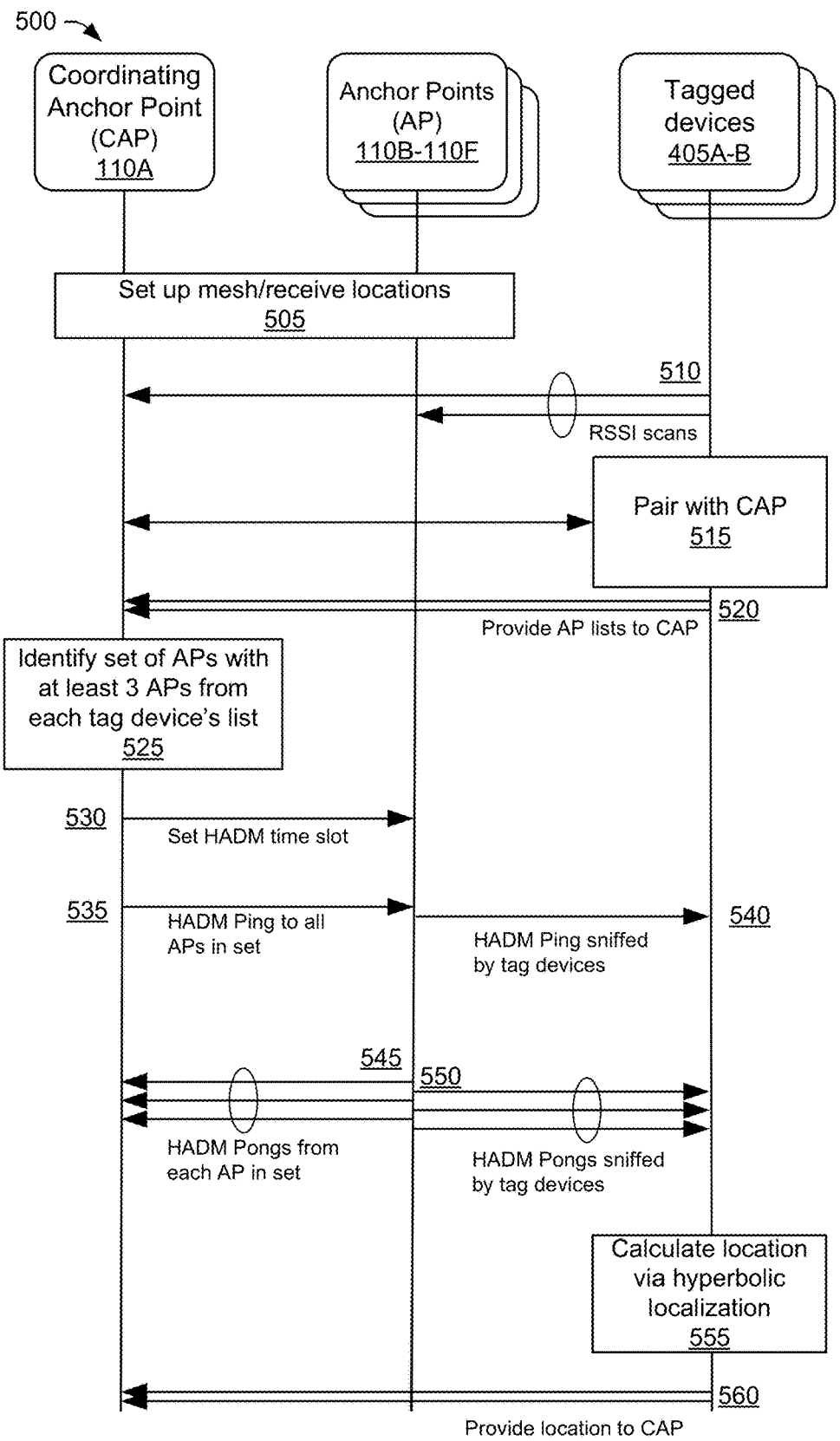
FIG. 5 illustrates example data and control transactions for a multi-tagged device coordinated HADM localization system.

FIG. 5 illustrates example data and control transactions 500 for a multi-tagged device coordinated HADM localization system in which aspects of techniques and systems for indoor localization using Bluetooth HADM may be implemented. The data and control transactions 500 of this example are performed by and between multiple tagged devices 405A and 405B, a coordinating anchor point (CAP) 110A, and a set of additional anchor points 110B-110F. These devices may be arranged as shown in FIG. 4, however, the tagged devices are not limited to any specific arrangement.

At 505, the coordinating anchor point (CAP) 110A and anchor points 110b-110F are set up in a wireless mesh network (e.g., as shown in FIG. 4). At 510, one or more of the tagged devices 405A and 405B perform signal scans (in this example an RSSI scan) to identify which anchor points (110A-110F) they can receive signals from.

At 515, the tagged devices 405A and 405B pair with the coordinating anchor point 110A, for example, through BLE connections. In some aspects, the coordinating anchor point 110A is selected for pairing based on having the highest measured signal strength by the tagged devices 405A and 405B. The tagged devices 405A and 405B may only pair with a Wi-Fi anchor point (e.g., a Wi-Fi root anchor point), in other aspects, the tagged device may also pair with a smart home device. In some aspects, each tagged device 405A and 405B independently selects an anchor point to pair with. In other aspects, the pairing of a first tagged device (e.g., tagged device 405A) with a particular anchor point (e.g., anchor point 110A) influences other tagged devices (e.g., tagged device 405B) to pair with the same anchor point, if that anchor point is available.

At 520, the tagged devices 405A and 405B each provide a list of anchor points that the respective tagged device received signals from (e.g., during the signal scan at 510) to the Coordinating Anchor Point (CAP) 110A. This list may include all anchor points the particular tagged device detects signals from. In other aspects, the list may include a subset of the detected anchor points. For example, tagged device 405A may send a list of the anchor points with the strongest signals at tagged device 405A and tagged device 405B may send a list of the anchor points with the strongest signals at tagged device 405B.

At 525, the coordinating anchor point 110A identifies a set of anchor points with at least three anchor points from each tagged device's list. In some aspects, when each tagged device's list of anchor points includes the three anchor points in common (in addition to the coordinating anchor point), the identified set of anchor points will be at least those three common anchor points. In some aspects, when the tagged devices lists do not include three anchor points in common, the identified set will include as many anchor points in common as possible.

At 530, the coordinating anchor point 110A sets a HADM time slot with at least three other anchor points from 110B-110F). In order to set the HADM time slot with the other anchor points, the coordinating anchor point selects a set of additional (e.g., additional to the paired/coordinating anchor point) anchor points from the provided list of anchor points. The coordinating anchor point then sends a set of one or more designation signals to the additional anchor points. The signals designate the additional anchor points as being selected for the HADM time slot and direct the additional anchor points to prepare to respond to the HADM ping from the coordinating anchor point (e.g., a ping received within the HADM time slot).

At 535, the coordinating anchor point 110A transmits a HADM ping that is received by the additional anchor points from 110B-110F previously coordinated with a HADM time slot. In some aspects, the HADM ping is a single ping sent from the coordinating anchor point that causes the additional anchor points to send HADM responses. This is different from existing HADM ping response systems in which each HADM ping results in a response from a single anchor point. At 540, the tagged devices 405A and 405B each sniff (receive without replying) the HADM ping.

At 545, each of the additional anchor points (e.g., selected from anchor points 110B-110F) with the HADM time slot sends a HADM pong (e.g., a HADM reply to the HADM ping) to the coordinating anchor point 110A. At 550, the tagged devices 405A and 405B each sniff the HADM pongs and calculates its own location based on the delay between the HADM ping and the received HADM pongs from the anchor points 110B-110F. As the initial HADM ping is sent from the coordinating anchor point 110A and not the tagged device 405A or 405B itself, the tagged devices do not have a way of directly calculating the time between when the HADM ping was sent out and the time when the HADM pong was received at the source of the HADM ping. Instead, each tagged device 405A or 405B is able to calculate, at 555, the difference between when that tagged device sniffed the HADM ping and when that tagged device sniffed the HADM response to the HADM ping. This time difference, plus the locations of the sources of the HADM ping and a particular HADM pong, may allow the tagged device 405A or 405B to calculate a hyperbola along which the tagged device lies.

With a single source HADM ping and three HADM responses from three additional anchor points, all with known locations, the tagged device calculates three hyperbolas and identifies its own location at the intersection of those three hyperbolas. This calculation is sometimes referred to as hyperbolic localization. In some aspects, HADM pongs and locations from more than three additional anchor points are used (e.g., for confirmation/error checking, additional accuracy). These calculations may include adjustments for the response time of the devices. Once the tagged device 405A or 405B calculates its own location, it may provide, at 560, that location to the coordinating anchor point 110A. In some aspects, the calculations for the location of a tagged device is performed in two dimensions, with only the horizontal coordinates of the anchor points in the Wi-Fi mesh considered. The calculation may instead be performed in three dimensions with the vertical coordinates of the tagged device considered.

Although the above described techniques and systems for indoor localization using Bluetooth HADM are directed at identifying a location of mobile devices, the techniques may also apply to identifying the locations of newly added stationary devices to a wireless mesh system (e.g., Wi-Fi mesh system). That is, the techniques can be used to localize new anchor points added to an existing system so long as the positions of a minimum number of existing anchor points are known. The identification of the initial anchor points may be by other techniques (e.g., global navigation satellite system (GNSS), global positioning system (GPS), user entry, etc.). In some aspects, the tagged devices may provide HADM timing data to the coordinating anchor point with the coordinating anchor point calculating the locations of the tagged devices. The above described techniques may identify a single static location for a mobile device. However, in some aspects, multiple HADM events may be performed in succession to determine the movements of a tagged device.

As used herein, a phrase referring to "at least one of" a list of items, and the like, refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

EXAMPLES

In the following section, additional examples are provided.

Example 1: A method for determining a location of a high-accuracy distance measurement (HADM) tagged device, the method comprising: performing a signal-strength scan to identify multiple anchor points; pairing, based on the signal-strength scan, the tagged device with a first anchor point of the identified anchor points; setting a HADM time slot for the first anchor point and at least two additional anchor points of the identified anchor points; initiating a HADM event, the HADM event comprising: sending a HADM ping; and receiving HADM responses from two or more of the identified anchor points; and calculating, based on at least a time of receipt of HADM responses received from the two or more of the identified anchor points, the location of the tagged device.

Example 2: The method of Example 1, wherein receiving the HADM responses comprises receiving a HADM response from the first anchor point, and wherein the calculating the location of the tagged device is further based on a time at which the tagged device sent the HADM ping.

Example 3: The method of Example 2, wherein setting the HADM time slot comprises: providing a list of the multiple anchor points identified by the tagged device to the first anchor point; and receiving a designation from the first anchor point at the additional anchor points, the designation selecting the additional anchor points for the HADM time slot and directing the additional anchor points to prepare to respond to the HADM ping from the tagged device.

Example 4: The method of Example 2, wherein sending the HADM ping comprises sending a single HADM ping to trigger the first anchor point and the additional anchor points to send the HADM responses.

Example 5: The method of Example 1, further comprising: receiving location data from the first anchor point, wherein the location data comprises location data for the first anchor point and the additional anchor points, wherein calculating the location of the tagged device is performed using the location data for the first anchor point and one or more of the additional anchor points.

Example 6: The method of Example 1, further comprising: receiving location data from the first anchor point; and receiving location data from the additional anchor points, wherein calculating the location of the tagged device is further performed using the location data for the first anchor point and one or more of the additional anchor points.

Example 7: The method of Example 1, wherein calculating the location of the tagged device further comprises calculating a triangular trajectory.

Example 8: A method for determining a location of a high-accuracy distance measurement (HADM) tagged device, the method comprising: performing a signal-strength scan to identify multiple anchor points; pairing, based on the signal-strength scan for the identified anchor points, the tagged device with a first anchor point of the identified anchor points, the pairing using a HADM time slot at the first anchor point for at least two additional anchor points of the identified anchor points; initiating a HADM event, the HADM event comprising: sending a HADM ping; and receiving HADM responses from two or more of the identified anchor points; and calculating, based on at least a time of receipt of HADM responses received from the two or more of the identified anchor points, the location of the tagged device.

CONCLUSION

Although implementations for indoor localization using Bluetooth HADM have been described in language specific to certain features and/or methods, the subject of the appended claims is not necessarily limited to the specific features or methods described. Rather, the specific features and methods are disclosed as example implementations of indoor localization using Bluetooth HADM, and other equivalent features and methods are intended to be within the scope of the appended claims. Further, various different aspects are described, and it is to be appreciated that each described aspect can be implemented independently or in connection with one or more other described aspects. For example, these techniques may be realized using one or more of the entities or components shown in FIGS. 1 and 4, which may be further divided, combined, and so on. Although the illustrated aspects each show a single coordinated HADM event, in some aspects, multiple HADM events may be performed to repeatedly identify the locations of mobile devices as the mobile devices move. Thus, these figures illustrate some of the many possible systems or apparatuses capable of employing the described techniques.

The invention claimed is:

1. A method for determining a location of a high-accuracy distance measurement (HADM) tagged device, the method comprising:
   performing a signal-strength scan to identify multiple anchor points;
   pairing, based on the signal-strength scan, the tagged device with a first anchor point of the identified anchor points;
   setting a HADM time slot for the first anchor point and at least two additional anchor points of the identified anchor points;

providing a list of the multiple anchor points identified by the tagged device to the first anchor point;

receiving, at the at least two additional anchor points, a designation from the first anchor point, the designation selecting the at least two additional anchor points for the HADM time slot and directing the at least two additional anchor points to respond to a HADM ping from received the tagged device during the HADM time slot;

initiating a HADM event, the HADM event comprising:
sending the HADM ping within the HADM time slot;
receiving, by the first anchor point and the at least two additional anchor points, the HADM ping;
transmitting, by the first anchor point and the at least two additional anchor points, respective HADM responses during the HADM time slot; and
receiving the respective HADM responses from the first anchor point and the at least two additional anchor points; and calculating, based on a time at which the tagged device sent the HADM ping and respective times of receipt of the respective HADM responses received from the first anchor point and the at least two additional anchor points, the location of the tagged device.

2. The method of claim 1, wherein the calculating the location of the tagged device is further based on a time at which the tagged device sent the HADM ping.

3. The method of claim 1, wherein sending the HADM ping comprises:
sending the HADM ping as a single HADM ping during the HADM time slot, the single HADM ping configured to trigger the first anchor point and the at least two additional anchor points to send the respective HADM responses during the HADM time slot.

4. The method of claim 1, further comprising:
receiving location data from the first anchor point, wherein the location data comprises location data for the first anchor point and the at least two additional anchor points,
wherein calculating the location of the tagged device is performed using the location data for the first anchor point and one or more of the at least two additional anchor points.

5. The method of claim 1, further comprising:
receiving location data from the first anchor point; and
receiving location data from the at least two additional anchor points,
wherein calculating the location of the tagged device is further performed using the location data for the first anchor point and one or more of the at least two additional anchor points.

6. The method of claim 1, wherein calculating the location of the tagged device further comprises calculating a triangular trajectory.

* * * * *